(12) United States Patent
Muller

(10) Patent No.: US 7,497,014 B2
(45) Date of Patent: Mar. 3, 2009

(54) SLIDING BEARING AND METHOD FOR THE MANUFACTURE THEREOF

(75) Inventor: Herbert Muller, Nuremberg (DE)

(73) Assignee: Suspa Holding GmbH, Altdorf (DE)

( * ) Notice: Subject to any disclaimer, the term of this patent is extended or adjusted under 35 U.S.C. 154(b) by 709 days.

(21) Appl. No.: 10/848,081

(22) Filed: May 19, 2004

(65) Prior Publication Data

US 2004/0234178 A1 Nov. 25, 2004

(30) Foreign Application Priority Data

May 20, 2003 (DE) ................. 103 23 102

(51) Int. Cl.
- *A61M 25/02* (2006.01)
- *B21D 53/10* (2006.01)
- *B23D 11/00* (2006.01)
- *B23D 25/00* (2006.01)
- *B29D 31/00* (2006.01)
- *F16C 17/26* (2006.01)
- *F16C 19/00* (2006.01)
- *F16C 35/00* (2006.01)

(52) U.S. Cl. .............. 29/898.03; 29/434; 29/458; 29/898.06; 29/898.12; 156/242; 264/264; 285/145.4; 285/286.1; 285/293.1; 285/296.1; 384/12; 384/24; 384/35; 384/42; 384/130; 403/109.1; 403/109.8; 403/78; 403/377

(58) Field of Classification Search ............. 29/434, 29/450, 458, 525, 722, 897.2, 898.03, 898.06, 29/898.12, 898.043; 264/242, 262, 264; 384/12, 24, 29, 32, 34–36, 42, 58, 130, 139–140, 384/153; 285/24, 104, 144.1, 145.1, 145.4, 285/285.1, 26.1, 293.1, 294.3, 296.1, 330, 285/374, 286.1; 277/617; 403/109.1, 109.8, 403/278, 377; 156/242

See application file for complete search history.

(56) References Cited

U.S. PATENT DOCUMENTS 2,815,252 A 12/1957 Baker
2,865,692 A 12/1958 Gossmann (Continued)

FOREIGN PATENT DOCUMENTS

CH 583 384 12/1976

(Continued)

OTHER PUBLICATIONS

Worm, M.: Spezial-Kunstsoff F7, DBR. Nr. 94 30 87, Aug. 1974, 7pp.

Primary Examiner—David P Bryant
Assistant Examiner—Alexander P Taousakis
(74) Attorney, Agent, or Firm—Browdy and Neimark, P.L.L.C.

(57) ABSTRACT

A sliding bearing for axial and/or radial arrangement of a first bearing member in relation to a second bearing member, comprises a second bearing member, which has a bearing recess provided with a second slide face; a first bearing member, which is lodged in the bearing recess and which is mounted axially and/or radially, the first bearing member having a first slide face, which is opposite the second slide face and spaced therefrom by a clearance; at least one sliding/guiding element, which is disposed between the first and the second bearing members and fixed in relation to one bearing member, for guidance of a motion of the first relative to the second bearing member; an equalizing compound, which is disposed between the at least one sliding/guiding element and the bearing member relative to which is fixed the at least one sliding/guiding element, for adaptation of the guide clearance between the at least one sliding/guiding element and the slide face that is displaceable in relation thereto, the equalizing compound being solid in the operating state of the sliding bearing and free-flowing prior thereto.

1 Claim, 8 Drawing Sheets

U.S. PATENT DOCUMENTS

| | | |
|---|---|---|
| 3,061,887 A | 11/1962 | Clarke |
| 5,118,204 A | 6/1992 | Peters |
| 5,131,615 A * | 7/1992 | Hosan et al. ............... 248/161 |
| 5,328,269 A | 7/1994 | Mutolo et al. |
| 5,718,515 A * | 2/1998 | Furuhashi ................. 384/53 |
| 5,788,379 A | 8/1998 | Reeve |

FOREIGN PATENT DOCUMENTS

| | | |
|---|---|---|
| DD | 147 865 | 4/1981 |
| DE | 1 046 415 | 12/1958 |
| DE | 19 24 400 | 3/1970 |
| DE | 34 28 680 C2 | 2/1986 |
| DE | 39 31 139 A1 | 3/1991 |
| DE | 94 03 967.4 U1 | 9/1994 |
| EP | 0 441 267 A1 | 1/1991 |
| GB | 2 070 155 A | 9/1981 |
| WO | WO 90/07065 | 6/1990 |
| WO | WO 98/29668 | 7/1998 |

* cited by examiner

SLIDING BEARING AND METHOD FOR THE MANUFACTURE THEREOF

BACKGROUND OF THE INVENTION

1. Field of the Invention

The invention relates to a sliding bearing for axial and/or radial arrangement of a first bearing member, in particular an interior pipe, in relation to a second bearing member, in particular an exterior pipe, as well as to a method of manufacturing the sliding bearing.

2. Background Art

In telescopic structures, several pipes of successively decreasing diameter are insertable one into the other. It is of great importance that the pipes be slidable substantially free from play, accurately guided along a single central longitudinal axis. Frequently, work tolerances are the reason for the lack of accurate guidance right from the start. Grinding the slide faces for corresponding fit cannot be considered because of the cost factor.

SUMMARY OF THE INVENTION

It is an object of the present invention to embody a sliding bearing at as low a cost as possible that will overcome the prior art drawbacks.

This object is attained in a sliding bearing comprising a second bearing member which has a bearing recess provided with a second slide face; a first bearing member, which is lodged in the bearing recess and which is mounted axially and/or radially, the first bearing member having a first slide face, which is opposite the second slide face and spaced therefrom by a clearance; at least one sliding/guiding element, which is disposed between the first and the second bearing members and fixed in relation to one bearing member, for guidance of a motion of the first relative to the second bearing member; an equalizing compound, which is disposed between the at least one sliding/guiding element and the bearing member relative to which is fixed the at least one sliding/guiding element, for adaptation of the guide clearance between the at least one sliding/guiding element and the slide face that is displaceable in relation thereto, the equalizing compound being solid in the operating state of the sliding bearing and free-flowing prior thereto. The sliding bearing according to the invention is manufactured by a method comprising the following steps: providing a second bearing member with a bearing recess that comprises a second slide face, and a first bearing member which is insertable in the bearing recess, having a first slide face that is allocated to the second slide face; applying a curable equalizing compound, which is free-flowing when worked, to at least a section of a slide face and/or to the sliding band; placing the sliding band on the equalizing compound; inserting the first bearing member into the bearing recess of the second bearing member so that the at least one sliding band rests uniformly and planely on the opposite slide face and the excess equalizing compound is squeezed into equalizing areas that are provided therefor; curing the equalizing compound.

The gist of the invention resides in a sliding element being provided between two bearing members that are to be arranged one in relation to the other, with accurate positioning of the sliding element taking place by way of an equalizing compound which is solid when in an operating state and free-flowing prior thereto, in particular upon assembly, so that the sliding element may uniformly adapt to the associated slide face.

Additional features and details of the invention will become apparent from the ensuing description of four exemplary embodiments, taken in conjunction with the drawing.

DESCRIPTION OF PREFERRED EMBODIMENTS

Figure 1:
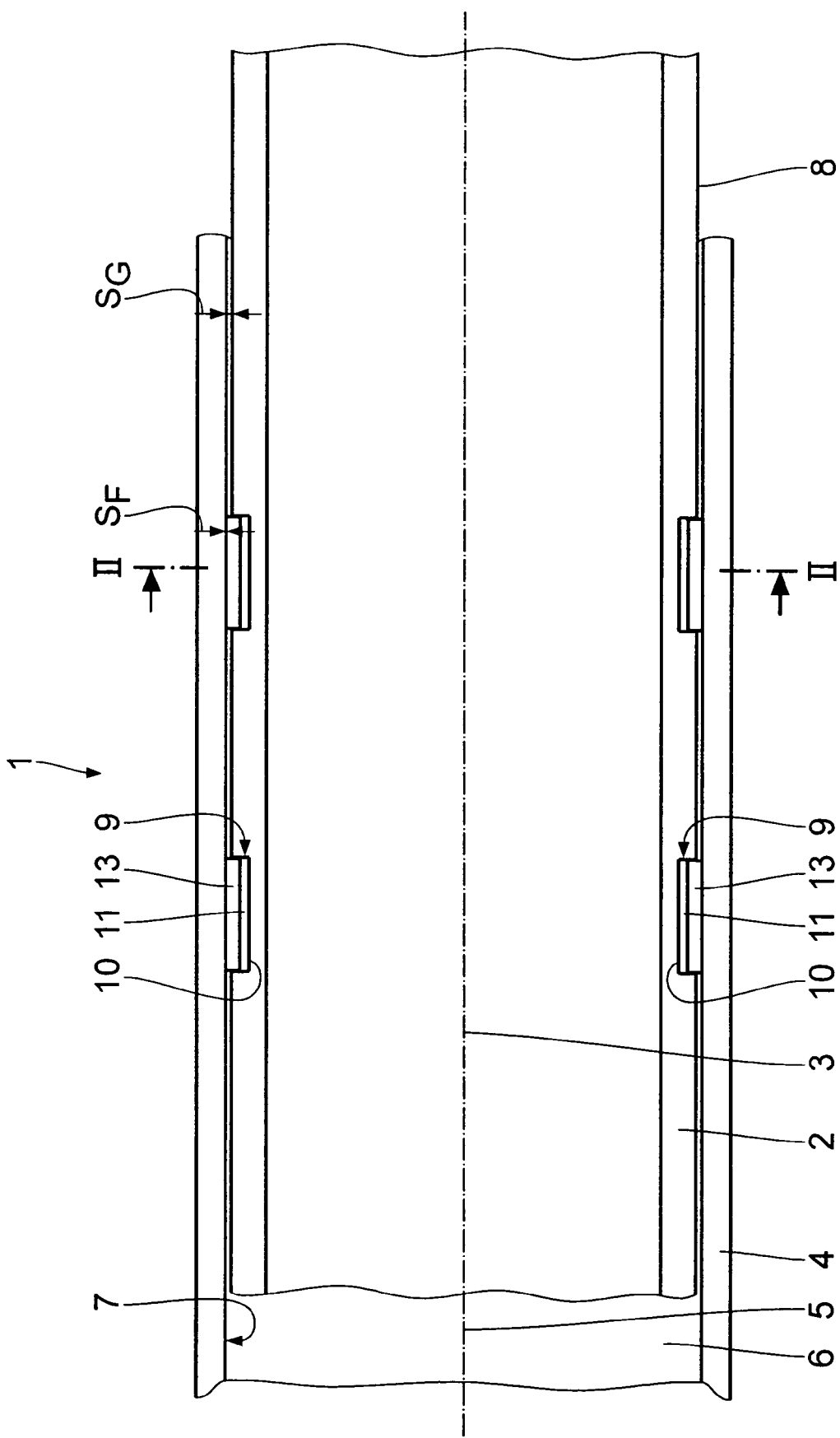
FIG. 1 is a longitudinal sectional view of a sliding bearing according to a first embodiment.
Figure 2:
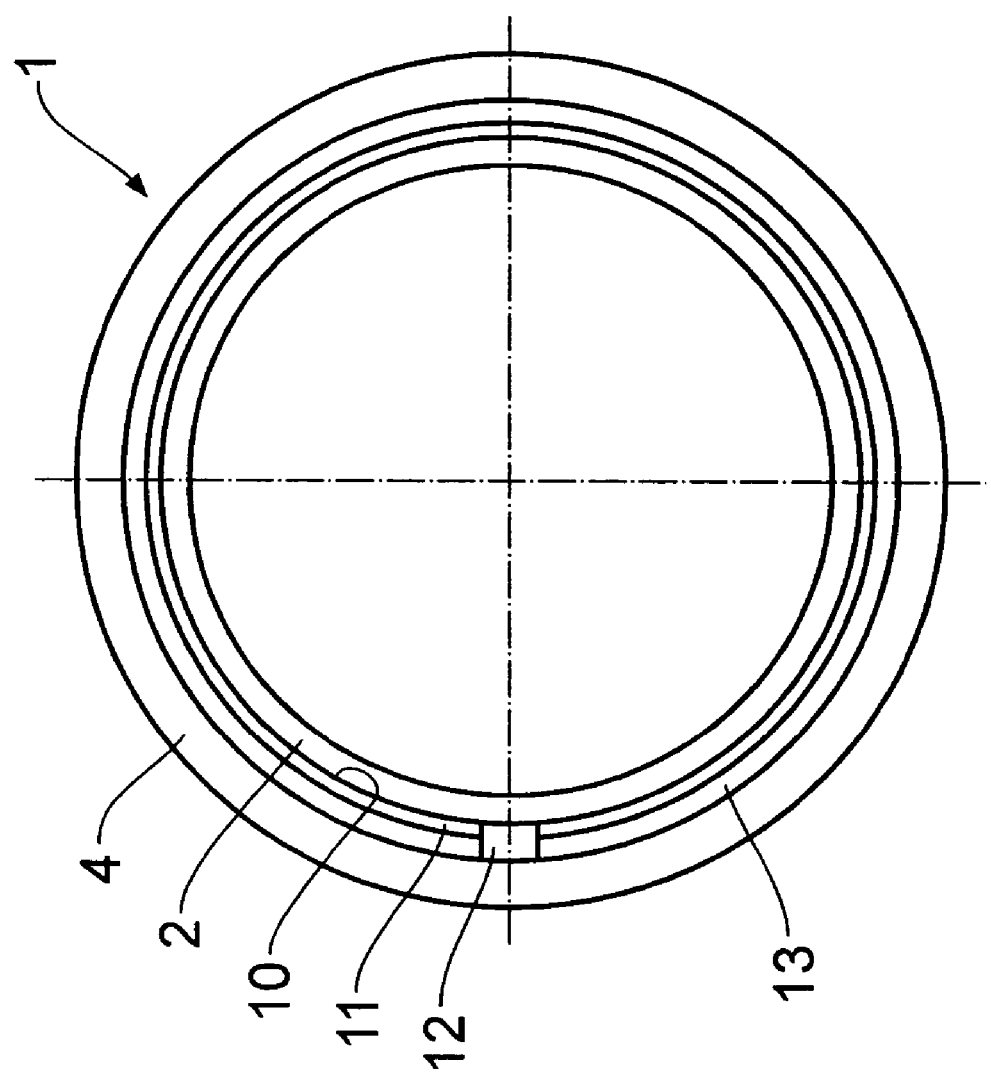
FIG. 2 is a cross-sectional view on the line II-II of FIG. 1.

The following is a description of a first embodiment of the invention, taken in conjunction with FIGS. 1 and 2. A sliding bearing 1 comprises an interior pipe 2 as a first bearing member, having an associated central longitudinal axis 3, and an exterior pipe 4 as a second bearing member, having an associated central longitudinal axis 5 which coincides with the axis 3. The sliding bearing 1 permits the interior pipe 2 to be axially and/or radially arranged in relation to the exterior pipe 4. The pipes 2 and 4 can be structural components of a telescopic unit of several pipes which are disposed successively one within the other and which are displaceable one relative to the other for example by a spindle drive.

The exterior pipe 4 encloses a cylindrical interior space 6, which is open at the ends, and it comprises a slide face 7 on its inside. The interior pipe 2, which is disposed in the exterior pipe 4 concentrically thereof, comprises a cylindrical slide face 8 on its external surface. A clearance $S_G$ exists between the slide faces 7 and 8, which is sufficiently dimensioned for the interior pipe 2 to be pushed into the exterior pipe 4 without any problems. Even though the slide faces 7 and 8 are substantially parallel to each other, work tolerances may nevertheless lead to minor fluctuations.

The interior pipe 2 comprises at least one encircling annular groove 9, or two annular grooves as seen in FIG. 1, and by advantage several annular grooves 9, which are axially offset from one another, with the axial extension thereof exceeding, in particular considerably exceeding, the radial depth thereof. A equalizing compound 11 is located at the bottom 10 of the annular groove 9; it will be described in detail below, taken in conjunction with the description of how to produce the sliding bearing. A sliding band 13 in the form of a sliding/guiding element is located on the equalizing compound 11, encircling the interior pipe 2 except for an equalizing gap 12. This sliding band 13, which is located in the annular groove 9, stands out radially from the upper edge of the annular groove 9 and thus from the slide face 8, resting planely and uniformly on the slide face 7. For excellently guided displaceability, as frictionless as possible, of the interior pipe 2 within the exterior pipe 4, provision can be made for some rather insignificant, regular guide clearance $S_F$ between the outer face of the sliding band 13 and the slide face 7. The sliding band 13 consists of a material of good sliding capability, in particular of plastics. Teflon or plastics mixed with bronze particles are especially preferred. The equalizing compound 11 is an adhesive for fixing the sliding band 13 in the associated annular groove 9. The equalizing compound 11 used may also be a filling compound without adhesive effect. In this case, the sliding band 13 is held in the position seen in FIG. 1 only by the annular groove 9 and the opposed slide face 7. In the embodiment according to FIG. 1, the sliding bearing 1 works as a radial as well as an axial bearing.

It is also possible to fix the sliding band 13 directly on the interior pipe 2 without corresponding annular grooves. Further, the annular grooves may run in the axial direction only across part of the axial length of the sliding band 13, taking up only excess equalizing compound 11. It is sufficient if the slide face 7, on which the sliding band 13 rests for sliding displacement, possesses only insignificant surface roughness. The slide face 8 can have a rougher surface. However, it must not touch the opposite slide face 7. In general, only the slide face the sliding band 13 rests on for sliding displacement has to be especially smooth. This does not apply to the other slide face.

The following is a description of the manufacture and mode of operation of the sliding bearing 1. The interior pipe 2, which is provided with annular grooves 9 and which is not inside the exterior pipe 4 prior to assembly, is provided with a free-flowing, pasty equalizing compound 11 that is applied to the bottom 10 of the annular grooves 9. The compound 11 may be a curable adhesive or a curable resin. Fundamentally, it is also conceivable to use curable compounds without adhesive effect. Excess equalizing compound 11 is applied in the process. Then a sliding band 13 is placed on the equalizing compound 11 in such a way that the sliding band 13 encloses the interior pipe 19 with the exception of a equalizing gap 12. Because of the excess compound 11, the sliding band 13 stands out more than seen in FIG. 1 in the radial direction. Then the exterior pipe 4 is pushed on the correspondingly prepared interior pipe 2, the respective sliding band 13 being pressed radially inwards to such an extent that it rests uniformly and planely on the slide face 7 of the exterior pipe 4. Any excess equalizing compound 11 is pressed into the equalizing gap 12. It is also possible that the equalizing compound 11 escapes outwards in the vicinity of the edges of the annular groove 9. A mandrel is used for joining the two pipes 2 and 4, positioning the pipes 2 and 4 relative to each other as desired. Once the equalizing compound 11 has cured, accurate fit of the sliding bands 13 in relation to the associated slide face 7 is produced so that the pipes 2, 4 are insertable one into the other by accurate fit.

Figure 3:
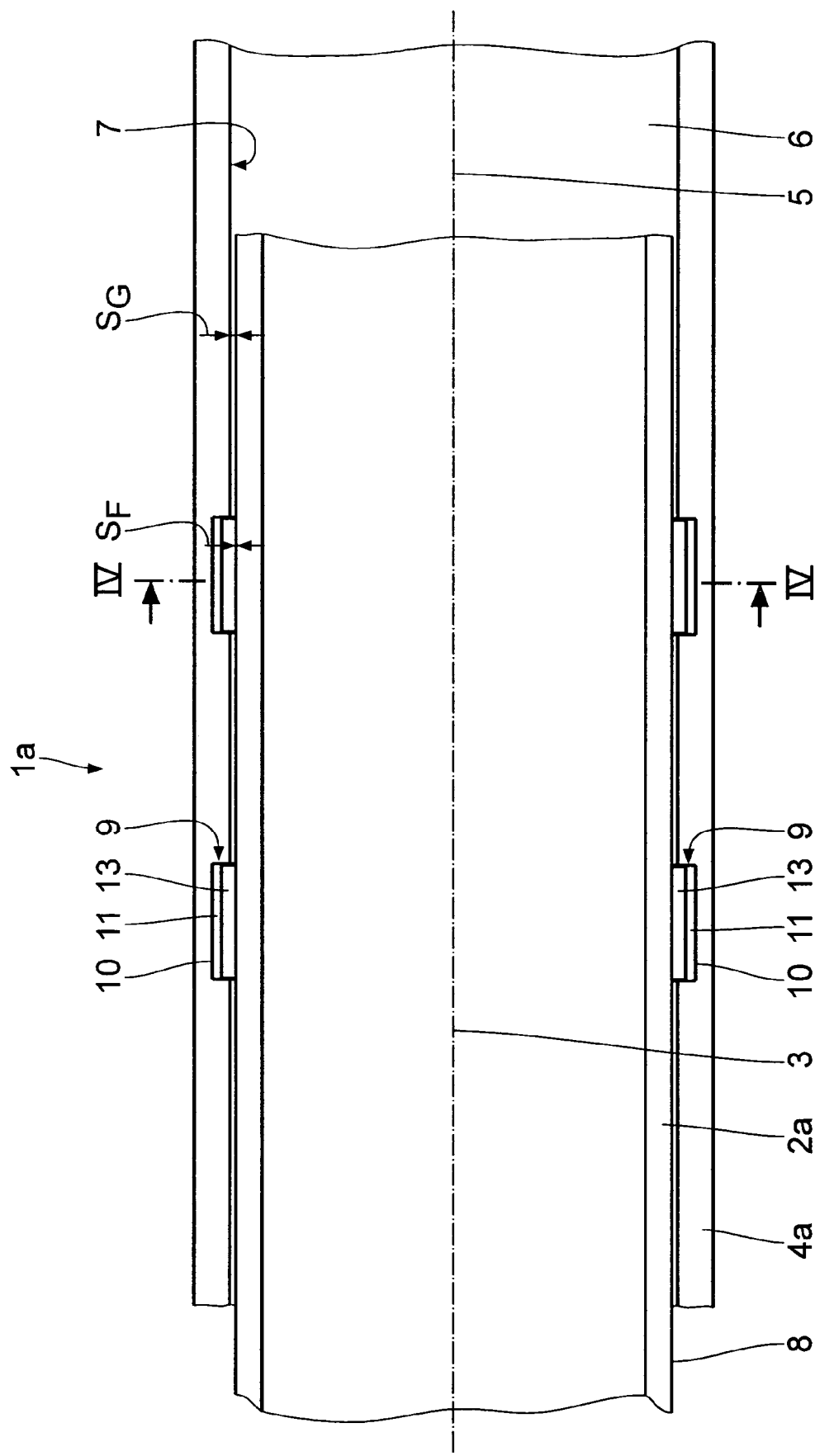
FIG. 3 is a longitudinal sectional view of a sliding bearing according to a second embodiment.
Figure 4:
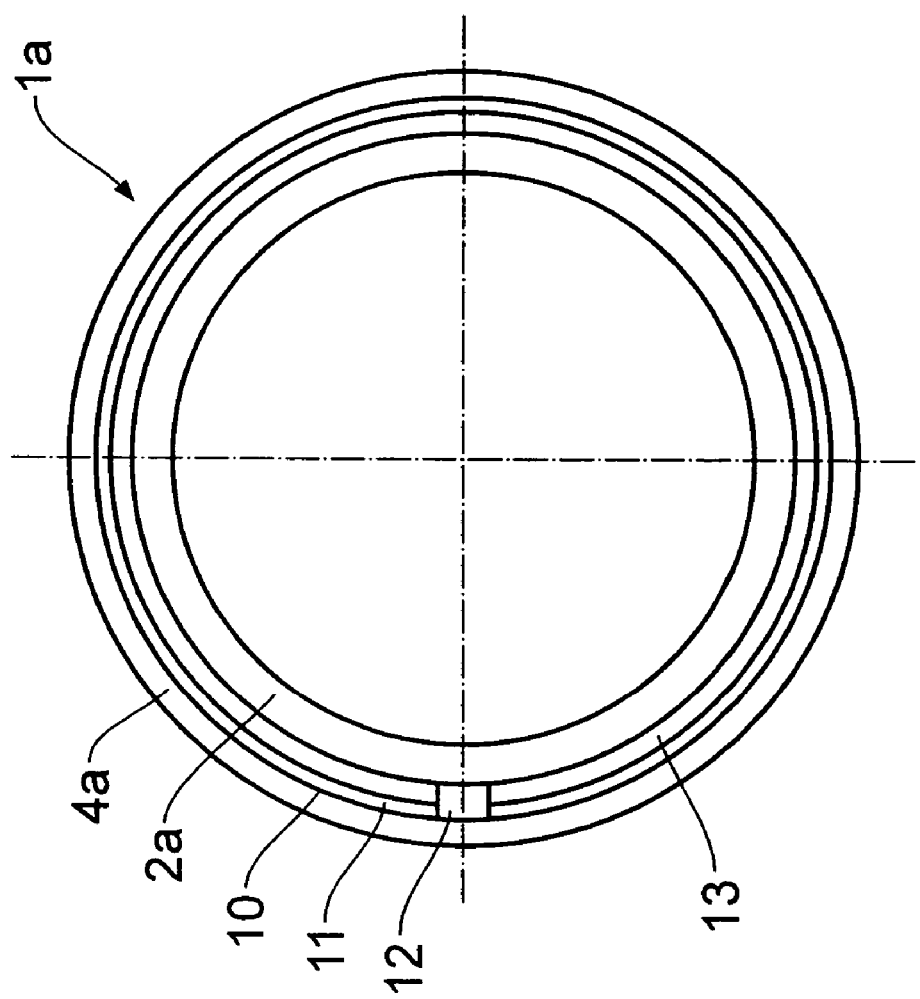
FIG. 4 is a cross-sectional view on the line IV-IV of FIG. 3.

The following is a description of a second exemplary embodiment of the invention, taken in conjunction with FIGS. 3 and 4. Constructionally identical parts have the same reference numerals as in the first embodiment, to the description of which reference is made. Functionally identical parts that differ in construction have the same reference numerals with an a affixed. The essential difference from the first embodiment resides in that the annular grooves 9 are not provided on the interior pipe 2, but on the inside of the exterior pipe 4a so that also the sliding bands 13 are fixed to the inside of the exterior pipe 4a, resting slidingly on the slide face 8 of the interior pipe 2a. As regards the manufacture and mode of operation of the sliding bearing 1a, reference is made to the explanation of the first embodiment.

Figure 5:
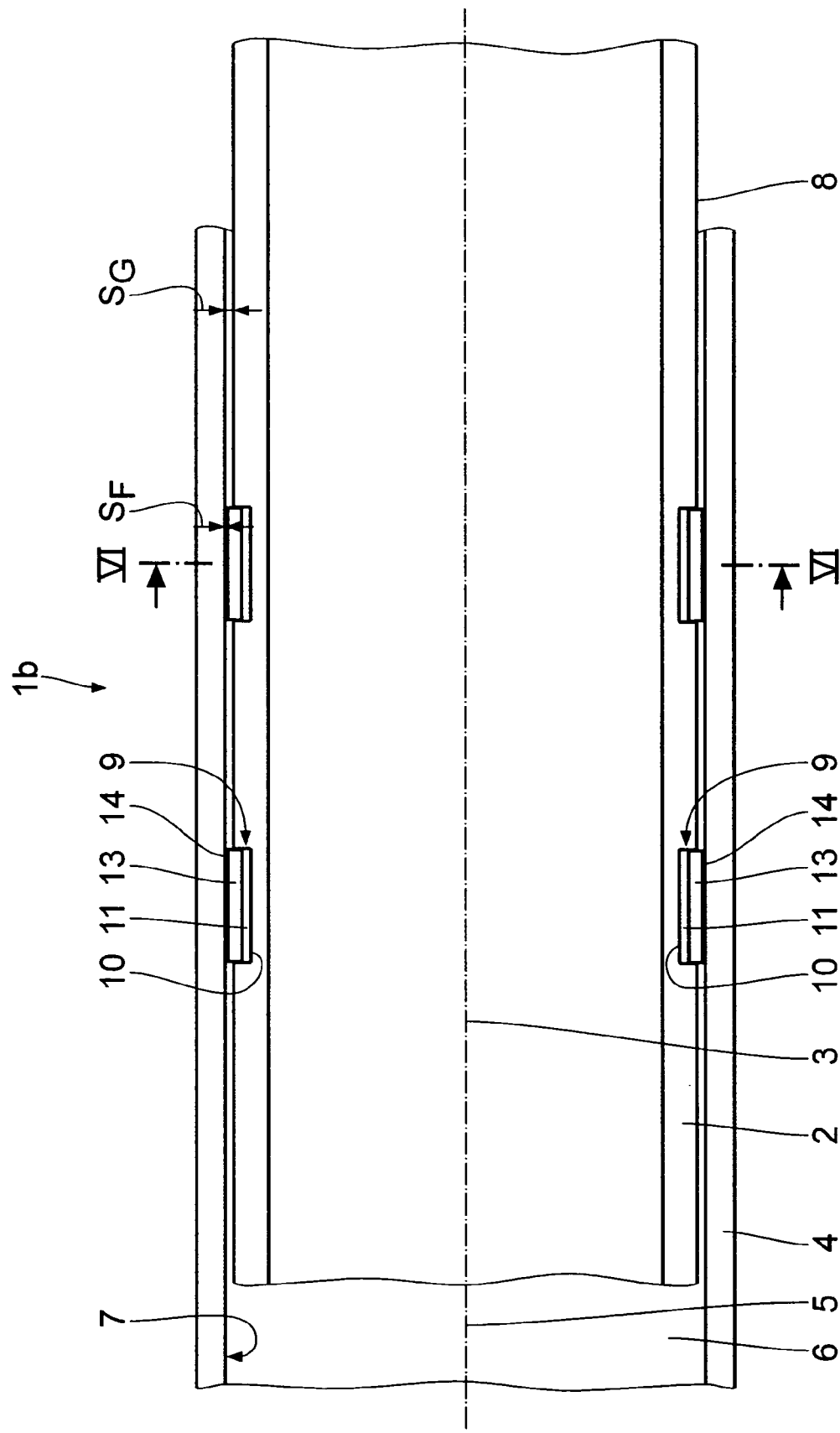
FIG. 5 is a longitudinal sectional view of a sliding bearing according to a third embodiment.
Figure 6:
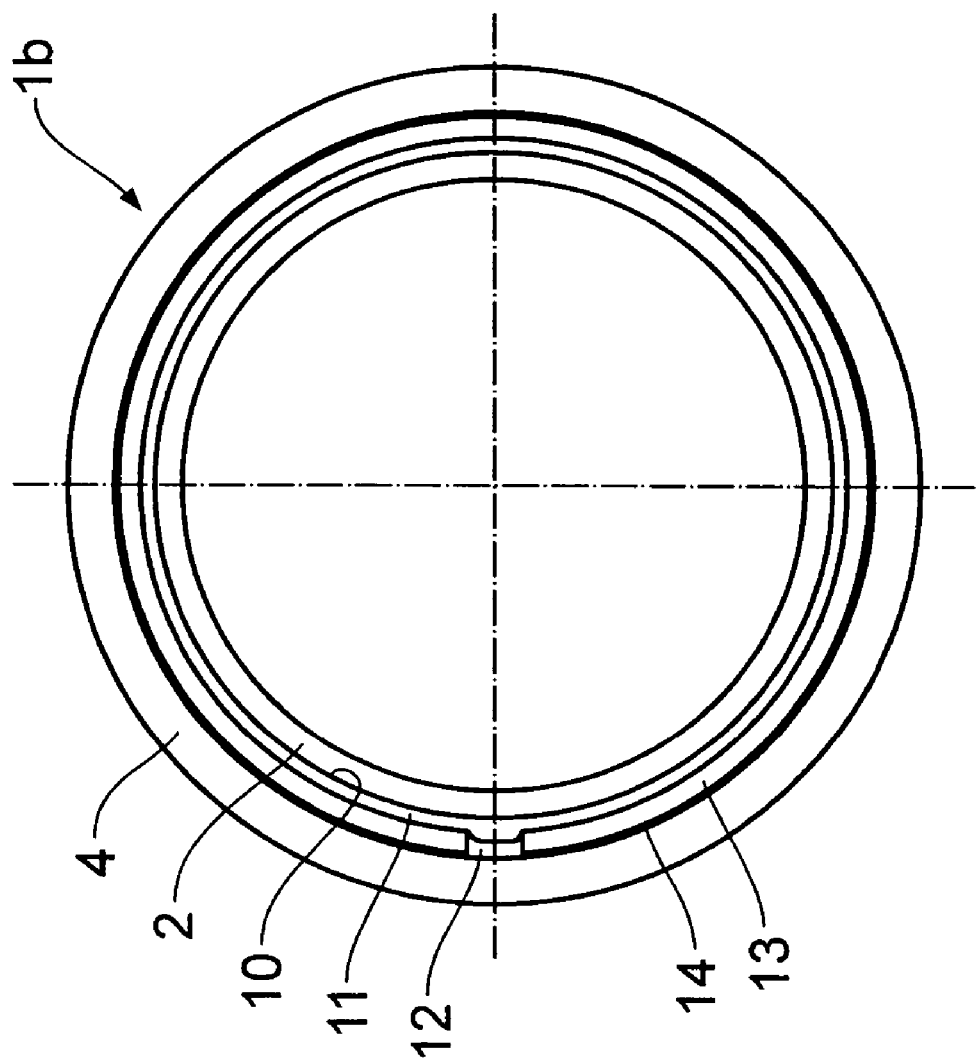
FIG. 6 is a cross-sectional view on the line VI-VI of FIG. 5.

A third embodiment of the invention will be described below, taken in conjunction with FIGS. 5 and 6. Constructionally identical parts have the same reference numerals as in the first exemplary embodiment, to the description of which reference is made. Functionally identical parts that differ in construction have the same reference numerals with a b affixed. The sliding bearing 1b has substantially the same structure as the sliding bearing of the first embodiment. The sliding bands 13 are connected with the interior pipe 2. Upon manufacture, the sliding bands 13 possess a detachable film 14 outside. Upon assembly of the interior pipe 2 and the still free-flowing equalizing compound 11, the interior pipe 2, together with the sliding bands 13 and the films 14 located thereon, is inserted into the exterior pipe 4, as seen in FIG. 5. After the equalizing compound 11 has cured, the interior pipe 2 is extracted from the exterior pipe 4 and the films 14 are removed. For standard operation, the interior pipe 2 is then again pushed into the exterior pipe 4, there being now some insignificant guide clearance $S_F$ between the outside of the sliding bands 13 and the associated slide face 7; this clearance $S_F$ corresponds to the thickness of the film and is indispensable for as frictionless as possible a displacement. In this regard, FIG. 5 does not show the final state of operation of the sliding bearing 1b, but an intermediate state in the production of the sliding bearing 1b with the film 14 still in place.

Figure 7:
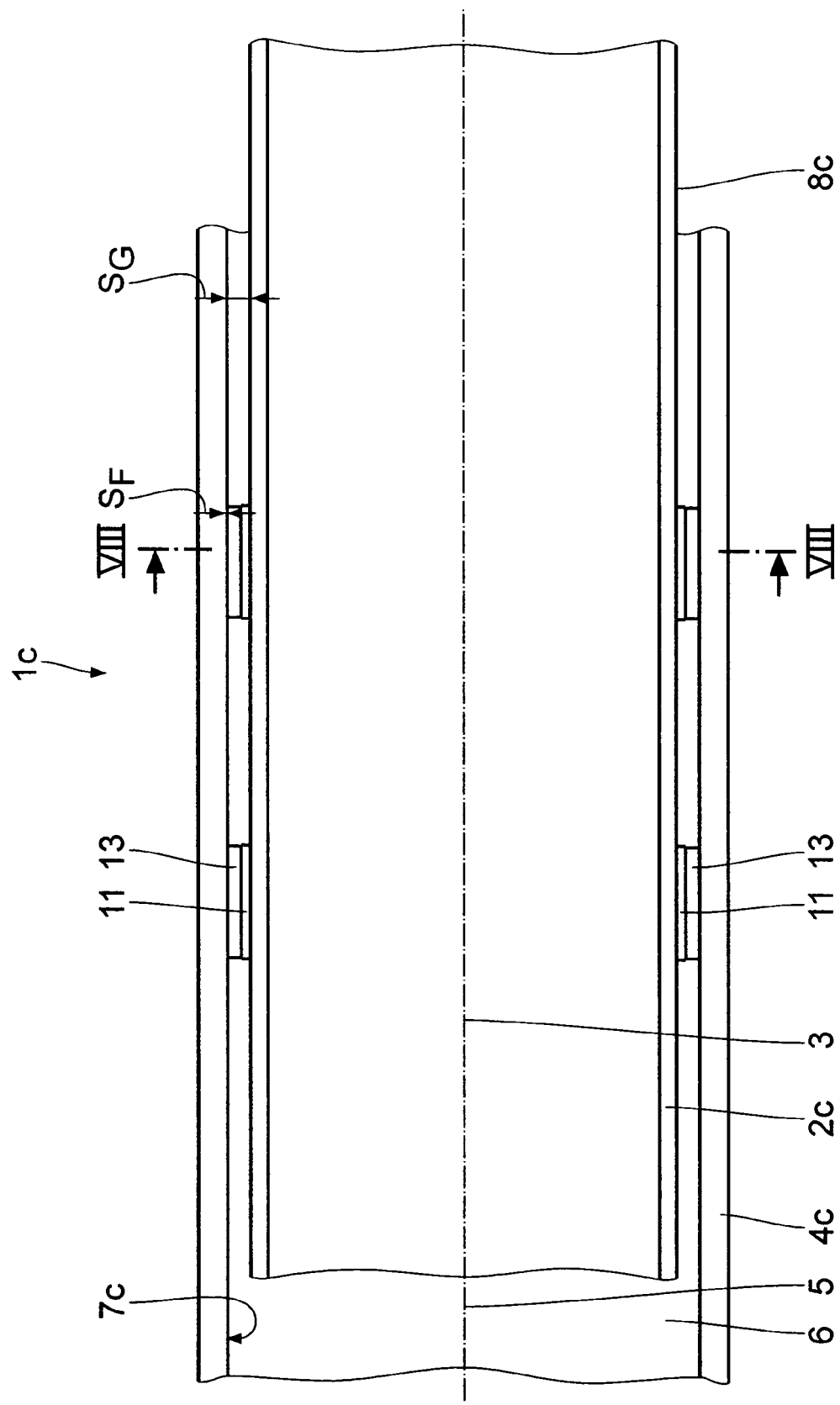
FIG. 7 is a longitudinal sectional view of a sliding bearing according to a fourth embodiment.
Figure 8:
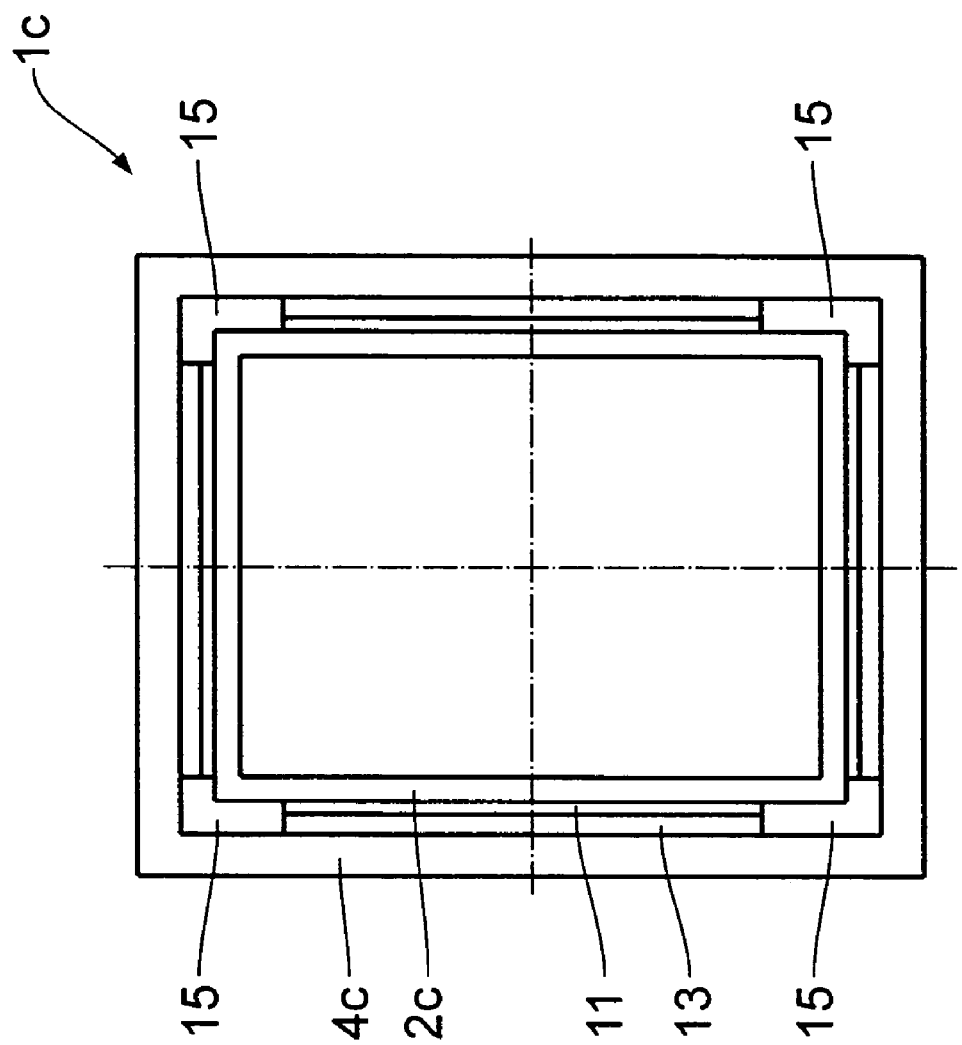
FIG. 8 is a cross-sectional view on the line VIII-VIII of FIG. 7.

A fourth embodiment of the invention will be described below, taken in conjunction with FIGS. 7 and 8. Constructionally identical parts have the same reference numerals as in the first exemplary embodiment, to the description of which reference is made. Functionally identical parts that differ in construction have the same reference numerals with a c affixed. The exterior pipe 4c and the interior pipe 2c have a rectancular cross-sectional shape seen in FIG. 8. It is also possible to provide other non-circular cross-sectional forms, for example elliptical cross sections for non-rotatability of the two pipes 2c, 4c relative to each other to be obtained. The interior pipe 2c comprises four slide faces 7c, on each of which equalizing compound 11 and a sliding band 13 placed thereon are provided, reaching substantially across the full width of the respective slide face 7c. No sliding band 13 is provided in the corner area 15 of the interior pipe 2c. The corner areas 15 serve as an equalizing space for any excess equalizing compound 11. Unlike the first embodiment, the sliding bands 13 of the fourth embodiment are not accommodated in annular grooves 9. This is however possible. The non-circular cross-sectional shape of the pipes 2c and 4c ensures that these pipes are not displaceable radially, but only axially.

What is claimed is:

1. A method of manufacturing a sliding bearing for at least one of axial and radial arrangement of a first bearing member in relation to a second bearing member, comprising the following steps:
   a. providing a second bearing member with a bearing recess that comprises a second slide face, and a first bearing member which is insertable in the nearing recess, having a first slide face that is allocated to the second slide face;
   b. applying a curable equalizing compound, which is free-flowing when worked, to a second of a slide face and to a sliding band;
   c. placing the sliding band on the equalizing compound;
   d. inserting the first bearing member into the bearing recess of the second bearing member so that the at least one sliding band rests uniformly and planely on the opposite slide face and the excess equalizing compound is squeezed into equalizing areas that are provided therefore;
   e. curing the equalizing compound;
   f. wherein the at least one sliding band applied to the equalizing compound comprises a detachable film on its outside; and wherein after curing of the equalizing compound, the first bearing member is withdrawn from the bearing recess and the film is removed, whereby a predetermined guide clearance $S_F$ is produced between the outside of the at least one sliding band and the opposite slide face and/or the excessive equalizing compound is prevented from adhering to the slide face.

* * * * *